Patented June 2, 1925.

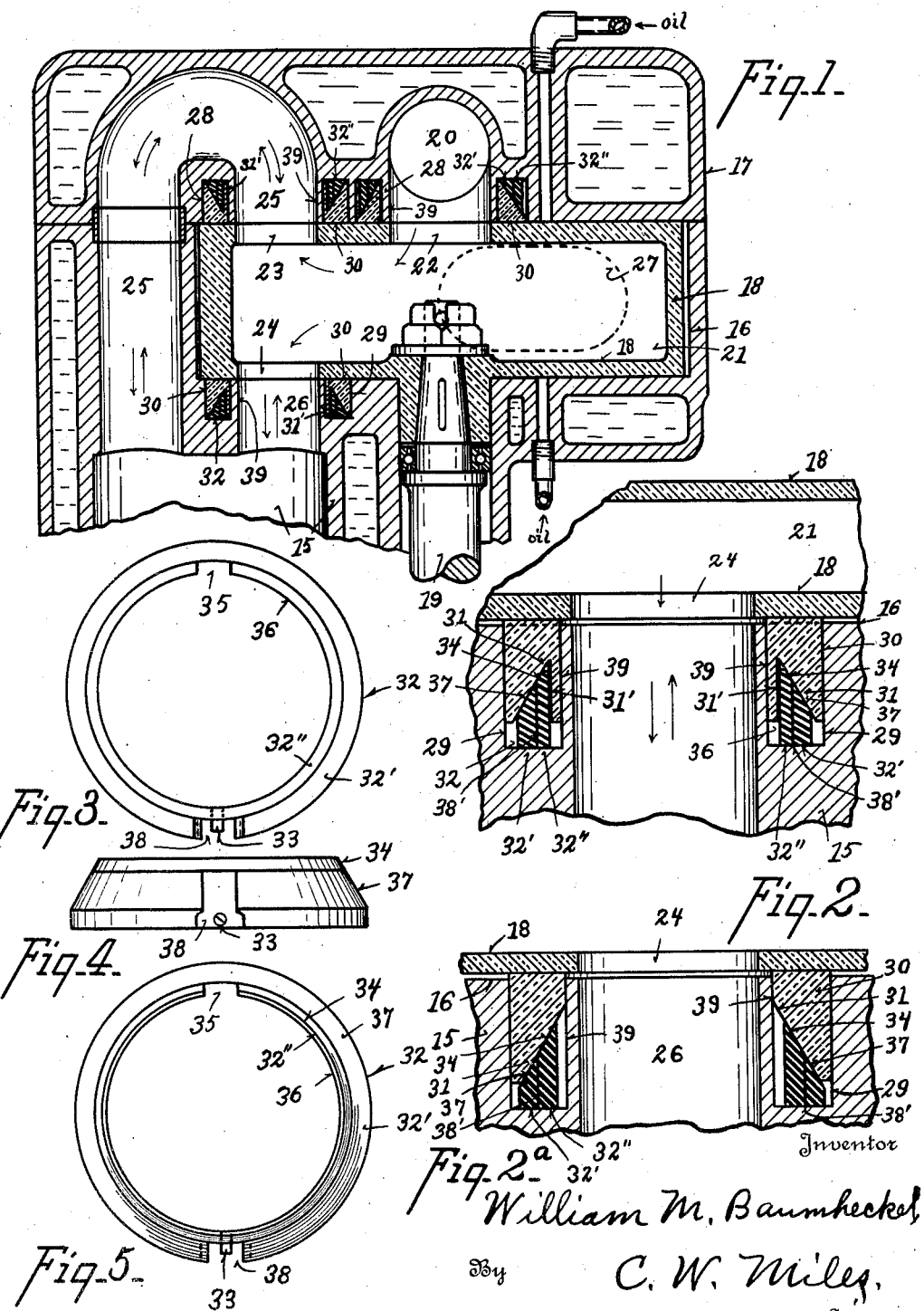

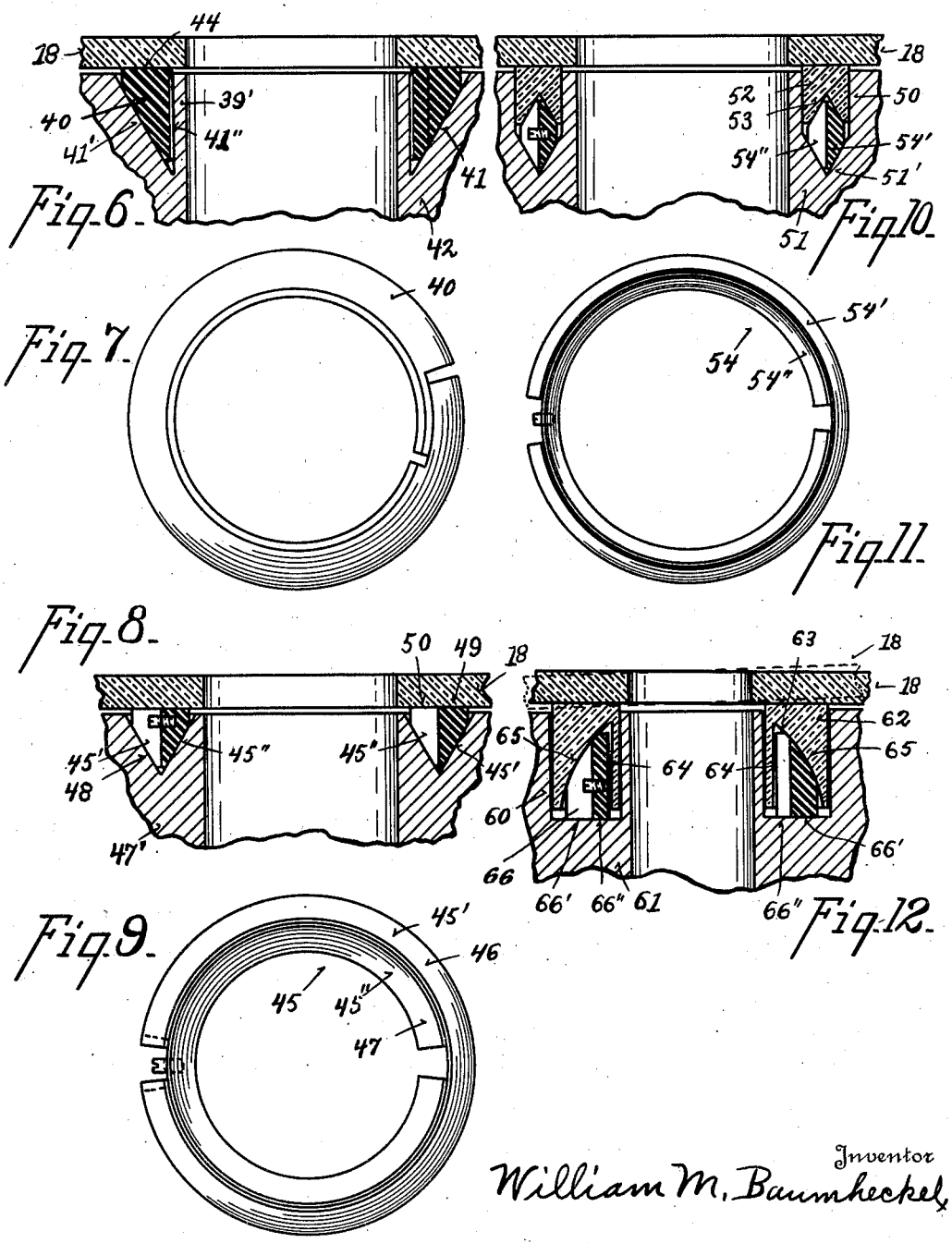

1,540,240

UNITED STATES PATENT OFFICE.

WILLIAM M. BAUMHECKEL, OF MILWAUKEE, WISCONSIN.

LEAKPROOF JOINT.

Application filed September 22, 1921. Serial No. 502,416.

*To all whom it may concern:*

Be it known that I, WILLIAM M. BAUM-HECKEL, a citizen of the United States, residing at Milwaukee, in the county of Milwaukee and State of Wisconsin, have invented certain new and useful Improvements in Leakproof Joints, of which the following is a specification.

My invention relates to improvements in a leak-proof mechanical joint. One of its objects is to provide a leak-proof mechanical joint between relatively movable members and applicable to an extensive variety of valve and other joints. Another object is to provide a leak proof mechanical joint adapted to be applied to various types of valves and similar mechanisms to more effectually prevent leakage at the joints thereof. Another object is to provide a leak-proof joint adapted to be applied to rotary or reciprocatory valves for internal combustion engines to effectually prevent leakage thereof and to thereby enable the valve and engine to operate satisfactorily at low speeds as well as at high speeds. My invention also comprises certain details of form, combination and arrangement all of which will be fully set forth in the description of the accompanying drawings, in which;

Fig. 1 is a sectional detail through the cylinder and rotary valve mechanism of an internal combustion engine illustrating an application of my improved joint thereto to render it substantially leak-proof.

Fig. 2 is an enlarged sectional detail through a portion of the cylinder, rotary valve, and leak-proof joint shown in Fig. 1, taken upon the same plane as Fig. 1.

Fig. 2ª is a view similar to Fig. 2 illustrating a modification of my improved leakproof joint.

Fig. 3, is a bottom plan view of the leakproof ring of Fig. 2, detached.

Fig. 4, is a side elevation of the ring Fig. 3, detached.

Fig. 5, is a top plan view of the ring shown in Fig. 3, detached.

Fig. 6, is a view similar to Fig. 2, illustrating a modification.

Fig. 7, is a bottom plan view of the ring of Fig. 6, detached.

Fig. 8, is a view similar to Fig. 2, illustrating a modification.

Fig. 9 is a bottom plan view of the ring of Fig. 8, detached.

Fig 10 is a view similar to Fig. 2, illustrating a modification.

Fig. 11 is a top plan view of the ring of Fig. 10 detached.

Fig. 12 is a view similar to Fig. 2, illustrating a modification.

The accompanying drawings illustrate the preferred embodiments of my invention.

In Figs. 1 to 5 inclusive I have illustrated the application of my invention to an internal combustion engine to secure a substantially leak-proof joint between the engine cylinder and a rotatably actuated valve to admit and discharge the gases and to hold the gases sealed in the cylinder in a substantially leak-proof manner during the intervening period from the admission to the discharge. The practical use and efficiency of a rotary or reciprocatory valve for internal combustion engines is dependent upon attaining a practically leak-proof joint between the valve and cylinder at the ports, and any leakage is particularly noticeable and objectionable when the engine is operated at slow speeds, as a leakage which would amount to only a minor factor at high speeds, would become a major factor at slow speeds.

My invention is also applicable to steam engine valves, to gate valves, and generally wherever a substantially leak-proof joint is required between relatively movable members.

In Figs. 1 to 5, an internal combustion engine cylinder or cylinder block 15 has formed therein a valve chamber 16 which is closed by bolting the cylinder head 17 in place. A rotary valve 18 is located in the valve chamber 16 and mounted upon a shaft 19 continuously driven by gears from the engine shaft preferably at a ratio of one to two. The valve 18 is preferably of hollow or shell type with a cross partition to separate the valve shell into two compartments one to supply fresh fuel to the cylinders and the other to conduct away the exhaust. The fresh fuel enters through a port 20 in the head and enters the interior of the intake compartment of the valve 21 through a port 22. The fresh fuel after traversing the compartment 21 is conducted therefrom to an engine cylinder through either of two exit ports 23 and 24 in the valve which register periodically with ports 25 and 26 both leading to the same engine cylinder. The object of having two valve ports 23 and 24 and two engine ports 25 and 26 is to balance the valve and avoid unnecessary strain and impact thereon. Other ports, not shown, are provided through the wall of the valve casing 18 to periodically register with the cylinder ports 25 and 26 to exhaust the gases from the engine cylinder through a compartment of the valve 18 to an exhaust port 27 in the wall of the valve casing.

In order that the valve 18 may rotate freely within its casing with a minimum of gas leakage I provide channels or recesses, 28 and 29 encircling the entrance of the ports 25 and 26 into the valve casing and within said recesses are located annular members or rings 30 which are yieldingly held in contact and in sliding relation with the faces of the valve 18 to reduce gas leakage to a minimum. The rings 30 are also provided with inclined annular faces 31 against which are seated split compression rings 32 of triangular cross sectional pattern or having correspondingly inclined faces which serve to form leak-proof joints with the inclined faces 31 of the rings 30, and also leak proof joints with the bottoms of the channels 28 and 29, said split rings 32 are also sufficiently yielding and resilient to exert a yielding pressure on the rings 30 to hold the rings 30 yieldingly in contact with the face of the valve 18. As illustrated in Figs. 1 to 5 the respective rings 32 are each composed of two independent sections or split rings 32' and 32''. A pin 33 carried by the ring section 32'' enters the gap 38 between the ends of the ring section 32' to hold the rings in position relative to each other.

The ring section 32'' has an annular face 34 to engage and form a leak-proof joint with the inclined face 31 except at the gap 35 in ring section 32'' and an annular face 36 slightly out of engagement with the opposite face or flange 31' of ring 30. The ring section 32' has an annular face 37 to engage and form a leak proof joint with the face 31 of the ring 30 except at the gap 38, and an annular face 38' to engage and form a leak proof joint with the peripheral face of the ring section 32'', except at the gap 38. Pressure on ring 30 tending to force it further into recess 29 tends to close the gaps 35 and 38 and to decrease the diameter of the rings 32' and 32'', while the rings 32' and 32'' tend to resiliently resist such pressure. Thus as the ring 30 is crowded into the recess 29 the ring sections 32' and 32'' close up their gaps 35 and 38 until practically leak-proof contacts or joints are attained both with the inclined face 31 and by the bottom or ends of ring sections with the inner ends or walls of the recesses 28 and 29, and the respective gaps 35 and 38 are overlapped by unbroken portions of the respective ring sections 32' and 32'' to prevent escape of gas at either of said gaps, while the adjacent faces of rings 32' and 32'' are crowded into resilient contact to form a leak proof joint between said rings 32' and 32''.

The ring sections 32' and 32'' may be made from cast iron as well as steel, and provided with ground joints, and hence are able to retain their resiliency at high temperature. The rings are protected by the sleeves 39 from the direct action of the cylinder gases, and are sufficiently cooled by the cooling water being circulated through the water jacket spaces of the engine to prevent injury thereto or interference with their operation.

The inclined face 31 on the rings 30 and counterpart inclined faces 34 and 37 on the split rings 32' and 32'' may be turned either away from the joint as shown at the ports 24 and 25 in Figs. 1 and 2, where the pressure to be resisted is chiefly outwardly directed or the inclined faces may be turned inwardly toward the ports as shown at the port 20 in Fig. 1, where the pressure to be resisted is chiefly inwardly directed.

In the modification shown at the port 20 in Fig. 1, and at Fig. 2$^a$ the annular lip or flange 31' shown at the ports 24 and 25 of Fig. 1 and in Fig. 2, are omitted, and practically the entire end of the ring 30 is utilized in the formation of the inclined face 31.

In the modification Figs. 6 and 7, a single split ring 40 is employed of triangular cross sectional pattern. A V-shaped recess 41 is formed directly in the face of the valve casing in the body of the cylinder casting or block 42, and the split ring is seated in the V-shaped recess 41 so as to make a tight joint with the inclined face of the V-shaped recess and its face 41'' slightly out of contact with the annular flange 39' and also with its face 44 yieldingly held in sliding contact with the face of the valve 18.

In the modification Figs. 8 and 9 I have illustrated a ring 45 composed of two split sections 45' and 45'' which have oppositely inclined faces 46 and 47 to engage with the opposite faces of a V-shaped recess 48 cut in the face of the valve casing and in the cylinder block 47', the faces 49 and 50 of the ring sections 45' and 45'' are held yieldingly in contact with the face of the valve 18.

In the modification Figs. 10 and 11 I have illustrated a channel 50 cut in the face of the valve casing and in the cylinder block 51 with a V shaped bottom 51' to receive an annular ring 52 which has a V-shaped recess 53. The split ring 54 is preferably composed of two split ring sections 54' and 54'' which together form a split ring of double V-shaped cross sectional pattern, or of diamond cross sectional pattern.

The split ring 54 engages in the V-shaped bottom of the channel 50' and also in the V-shaped recess 53 of the annular ring 54 to form a substantially leak-proof joint.

In the modification Fig. 12, a channel 60 is cut in the face of the valve casing and in the cylinder block 61 in which is loosely seated an annular ring 62 having a recess 63 cut therein. One face 64 of the recess 63 is cut straight while the other face 65 of said recess 63 is cut to a pattern corresponding to a section of the periphery of a sphere, so that the ring 62 will have a limited rocking or ball and socket movement when seated upon the split ring, which is preferably constructed as heretofore described for Figs. 1 to 5 of two split ring sections 66' and 66". Thus any rocking movement on the part of the valve 18 can be accommodated or followed to a limited extent by movement of the ring 62 within its channel 60 and relative to the spherical split ring 66.

The mechanism herein shown and described is capable of considerable modification without departing from the spirit of my invention.

What I claim is:

1. A mechanical compression joint comprising two relatively movable members each provided with a port, an annular recess encircling but walled off from one of said ports, a continuous ring seated in the entrance to said annular recess and movable into and out of said recess to have sliding engagement with the opposite port carrying member, said continuous ring having an inclined face located within said annular recess, and a split ring having a face to engage the bottom of said annular recess, and an inclined face to engage the inclined face of said continuous ring, and serving to resiliently thrust said continuous ring into resilient contact with the opposite port carrying member.

2. A mechanical compression joint comprising two relatively movable members each provided with a port, an annular recess encircling but walled off from one of said ports, a continuous ring seated in the entrance to said annular recess and movable into and out of said recess to have sliding engagement with the opposite port carrying member, said continuous ring having a V-shaped recess in its inner face within said annular recess, and a split ring located in the lower portion of said annular recess having a face to engage the bottom of said annular recess and an inclined face to engage one of the inclined faces of said V-shaped recess to form a leak-proof joint therewith and to resiliently tend to thrust said continuous ring out of said annular recess and into contact with the opposite port carrying member.

3. An article of manufacture comprising an outer continuous ring and a pair of inner split rings coacting with said continuous ring along a frusto conical surface, said split rings having staggered joints and having contiguous faces lying in a common plane.

4. An article of manufacture comprising an outer continuous ring having a plane end surface and a plurality of inner split rings coacting with said continuous ring along a surface which is inclined relatively to said plane surface, said split rings having staggered joints and having contiguous faces lying in a common plane parallel to said continuous ring surface.

In testimony whereof I have affixed my signature.

WILLIAM M. BAUMHECKEL.